United States Patent
Pevear (10) Patent No.: US 10,811,869 B2
(45) Date of Patent: Oct. 20, 2020

(54) OVERCURRENT PROTECTION FOR BATTERY SYSTEMS

(71) Applicant: Proterra Inc., Greenville, SC (US)

(72) Inventor: Brian Pevear, San Mateo, CA (US)

(73) Assignee: Proterra, Inc., Burlingame, CA (US)

( * ) Notice: Subject to any disclaimer, the term of this patent is extended or adjusted under 35 U.S.C. 154(b) by 177 days.

(21) Appl. No.: 15/955,052

(22) Filed: Apr. 17, 2018

(65) Prior Publication Data

US 2019/0319448 A1  Oct. 17, 2019

(51) Int. Cl.

| | | |
|---|---|---|
| *H02H 7/18* | (2006.01) | |
| *H01M 2/34* | (2006.01) | |
| *H01M 10/0525* | (2010.01) | |
| *H01M 10/42* | (2006.01) | |
| *B60L 58/18* | (2019.01) | |
| *B60L 58/21* | (2019.01) | |

(52) U.S. Cl.
CPC ............... *H02H 7/18* (2013.01); *B60L 58/18* (2019.02); *B60L 58/21* (2019.02); *H01M 2/348* (2013.01); *H01M 10/0525* (2013.01); *H01M 10/425* (2013.01); *H01M 10/4207* (2013.01); *H01M 2010/4271* (2013.01); *H01M 2200/103* (2013.01); *H01M 2220/20* (2013.01)

(58) Field of Classification Search
None
See application file for complete search history.

(56) References Cited

U.S. PATENT DOCUMENTS

| | | |
|---|---|---|
| 7,433,794 B1 | 10/2008 | Berdicevsky et al. |
| 7,923,144 B2 | 4/2011 | Kohn et al. |
| 8,453,773 B2 | 6/2013 | Hill et al. |
| 9,219,366 B2 | 12/2015 | Kim |
| 9,592,738 B1 | 3/2017 | Paryani et al. |
| 2007/0188147 A1 | 8/2007 | Straubel et al. |
| 2009/0208821 A1 | 8/2009 | Kosugi et al. |
| 2010/0127663 A1* | 5/2010 | Furukawa ............... B60L 3/04 320/134 |

(Continued)

OTHER PUBLICATIONS

Rui, Hu, "Battery Management System for Electric Vehicle Applications", *Electronic These and Dissertations*, 5007, http://scholar.uwindsor.ca/etd (2011).

(Continued)

*Primary Examiner* — Christopher P Domone
(74) *Attorney, Agent, or Firm* — Bookoff McAndrews, PLLC (57) ABSTRACT

A battery system may include a controller and multiple parallel connected battery strings, with each string including at least one battery, a passive overcurrent protection device and an active overcurrent protection device. The passive overcurrent protection device may be configured to disconnect the string from the battery system when an electrical current in the string exceeds a first threshold value, and the active overcurrent protection device may be configured to disconnect the string from the battery system upon activation by the controller. The controller may be configured to (a) activate a first active overcurrent protection device of a first string of the multiple strings at a first time, and (b) activate a second active overcurrent protection device of a second string of the multiple strings at a second time different from the first time.

20 Claims, 3 Drawing Sheets

(56) References Cited

U.S. PATENT DOCUMENTS

| | | |
|---|---|---|
| 2011/0149454 A1 | 6/2011 | Shibuya et al. |
| 2012/0034497 A1 | 1/2012 | Hermann et al. |
| 2012/0105001 A1 | 5/2012 | Gallegos et al. |
| 2013/0179012 A1 | 7/2013 | Hermann et al. |
| 2013/0307476 A1 | 11/2013 | Darragh et al. |
| 2014/0153150 A1 | 6/2014 | LePort |

OTHER PUBLICATIONS

Extended European search report in corresponding European Application No. 19164104.2, dated Sep. 18, 2019 (8 pages).

* cited by examiner

FIG. 3

OVERCURRENT PROTECTION FOR BATTERY SYSTEMS

TECHNICAL FIELD

Embodiments of this disclosure relate to systems and methods for overcurrent protection for battery systems.

BACKGROUND

An energy storage system typically includes a plurality of batteries or other energy storage devices coupled together to provide electric power for an application. The total energy of the system may be scaled up or down by increasing or decreasing the number of batteries of the system. Energy storage systems, or battery systems, can be used in many applications. For example, a battery system having many batteries connected together can be used to provide power to buildings, machines, etc. In another example, a battery system may be used to power the traction motors of an electric vehicle. When the stored energy decreases, the battery system is recharged, for example, by using power from a utility grid, using power generated by an internal combustion engine, etc. Some such battery systems include overcurrent protection. Overcurrent is a current load in excess of the safe operating limit (or rated current) of the equipment (components of the battery system, systems that receive power from the battery system, electrical conductors, etc.). Overcurrent may result from many faults such as, for example, short circuit, overload, ground fault, battery damage, etc. The current disclosure is related to overcurrent protections systems and methods for battery systems.

SUMMARY

Embodiments of the present disclosure relate to, among others, systems and methods for overcurrent protection for a battery system. Each of the embodiments disclosed herein may include one or more of the features described in connection with any of the other disclosed embodiments.

In one embodiment, a battery system is disclosed. The battery system may include a controller and multiple battery strings connected in parallel. Each string may includes at least one battery, a passive overcurrent protection device and an active overcurrent protection device. The passive overcurrent protection device may be configured to disconnect the string from the battery system when an electrical current in the string exceeds a first threshold value, and the active overcurrent protection device may be configured to disconnect the string from the battery system upon activation by the controller. The controller may be configured to (a) activate a first active overcurrent protection device of a first string of the multiple strings at a first time, and (b) activate a second active overcurrent protection device of a second string of the multiple strings at a second time different from the first time.

In another embodiment, a battery system is disclosed. The battery system may include a controller, a first battery string and a second battery string. The first string may include a first battery pack, a first fuse, and a first active overcurrent protection device, and the second string may include a second battery pack, a second fuse, and a second active overcurrent protection device. The first active overcurrent protection device may be configured to disconnect the first string from the battery system upon activation by the controller, and the second active overcurrent protection device may be configured to disconnect the second string from the battery system upon activation by a controller. The controller may be configured to assign different time delays to the activation of the first and second active overcurrent protection devices. A time delay may be representative of an amount of time the controller will delay the activation of an active overcurrent protection device after a value of current in the string that the active overcurrent protection device is part of exceeds a threshold value.

In yet another embodiment, a method of operating a battery system is disclosed. The method may include detecting a value of electrical current in each battery string of the battery system. The battery system may include (a) multiples battery strings connected together in parallel, (b) each string may include one or more battery packs, an active overcurrent protection device, and a passive overcurrent protection device. The active overcurrent protection device may be configured to disconnect the string from the battery system upon activation by a controller. The method may also include activating using the controller, the active overcurrent protection device of a first string of the multiple strings a first time after the current in the first string exceeds a threshold value, and activating using the controller, the active overcurrent protection device of a second string of the multiple strings a second time after the current in the second string exceeds the threshold value. The second time may be different from the first time.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes systems and methods for overcurrent protection of a battery system. While principles of the current disclosure are described with reference to the battery system of an electric vehicle, it should be understood that the disclosure is not limited thereto. Rather, the systems of the present disclosure may be used in a battery for any application (e.g., battery of a stationary energy storage device, electric machine, electric tool, electric appliance, etc.). In this disclosure, relative terms, such as "about," "substantially," or "approximately" are used to indicate a possible variation of ±10% of a stated value. Any implementation described herein as exemplary is not to be construed as preferred or advantageous over other implementations. Rather, the term "exemplary" is used in the sense of example or illustrative.

Figure 1:
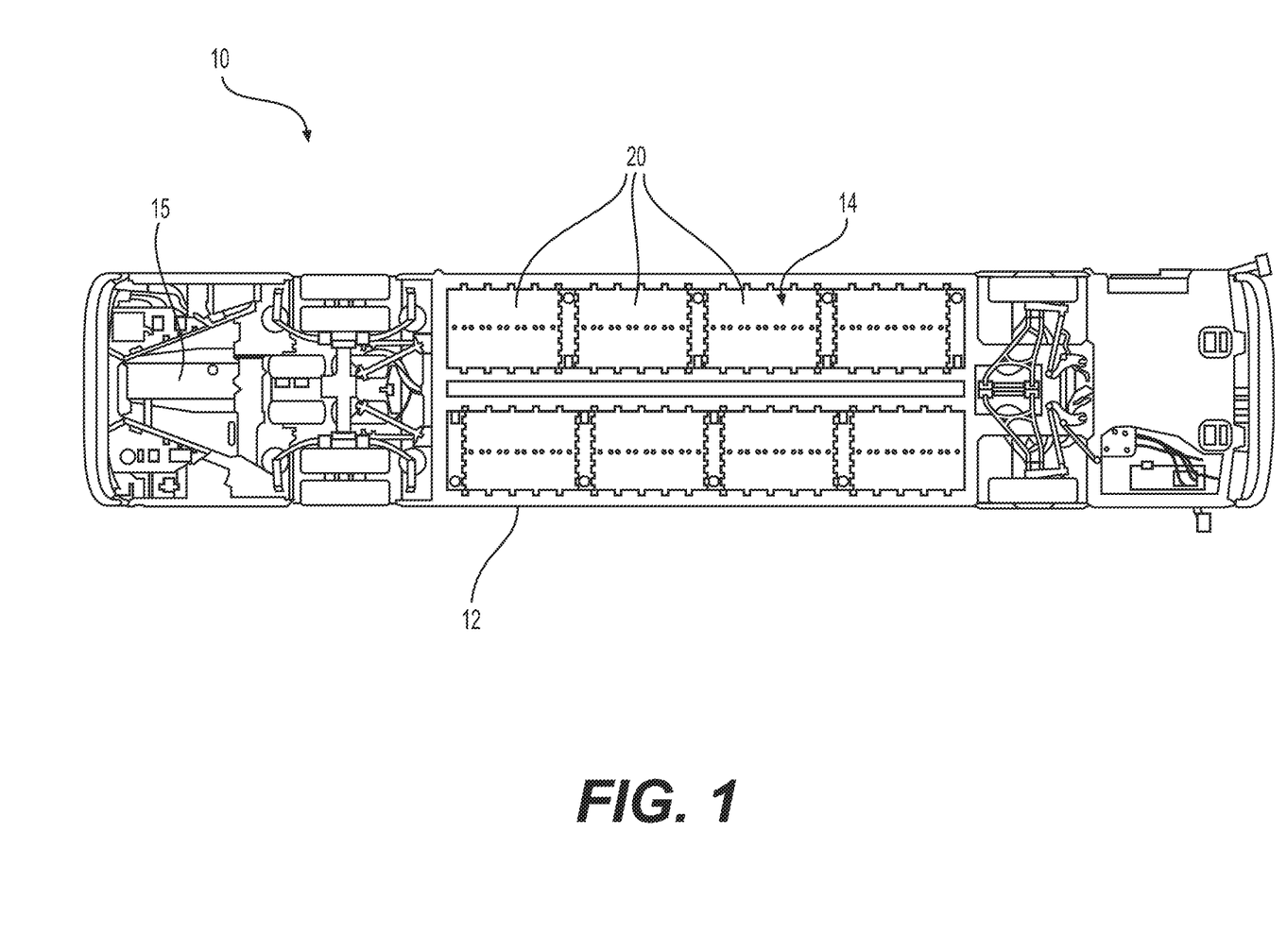
FIG. 1 illustrates an exemplary electric bus having a battery system in accordance with the present disclosure.

FIG. 1 illustrates the underside of an electric vehicle in the form of an electric bus 10. Bus 10 may be any type of bus (transit bus, long distance bus, low-floor bus, high-floor bus, etc.) and may include one or electric motors 15 that generate power for propulsion. Although FIG. 1 illustrates a single traction motor 15 located at the rear of the bus 10, this is only exemplary. As known to people skilled in the art, many other configurations are possible. For example, in some embodiments, a separate traction motor may be provided for each drive wheel of the bus 10. A battery system 14 supplies electric power to the traction motor 15 and other accessories (HVAC, lights, etc.) of the bus 10. In some embodiments, battery system 14 may have a modular structure and include multiple battery packs 20 electrically connected together. Battery packs 20 may, in general, be positioned anywhere on bus 10 (inside the bus, on the roof, etc.). In some embodiments, as illustrated in FIG. 1, battery packs 20 may be arranged in two parallel rows under the floor, with each row located on opposite sides of the longitudinal axis of the bus. As battery system 14 may have considerable weight, placing battery system 14 under the floor of bus 10 may assist in keeping the center of gravity lower and balance weight distribution, thus increasing drivability and safety.

Figure 2:
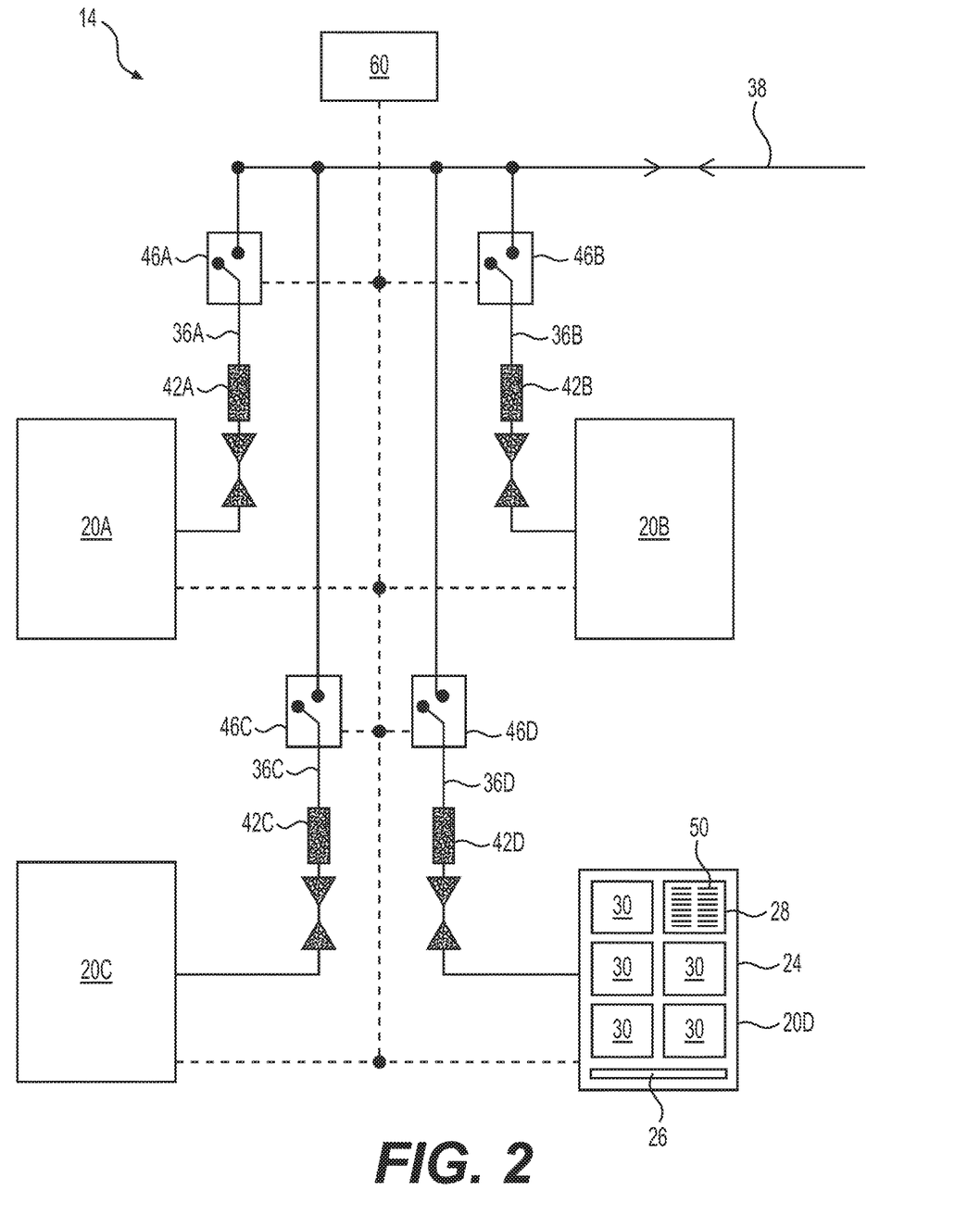
FIG. 2 is a schematic illustration of the battery system of FIG. 1 t.

FIG. 2 is a schematic illustration of an exemplary battery system 14 of bus 10. In FIG. 2, four battery packs 20A, 20B, 20C, and 20D are illustrated as being electrically connected together in parallel to form battery system 14. That is, a busbar 36A connects battery pack 20A to a common busbar 38, a busbar 36B connects battery pack 20B to common busbar 38, a busbar 36C connects battery pack 20C to common busbar 38, and a busbar 36D connects battery pack 20D to common busbar 38. Common busbar 38 directs power into battery system 14 during charging, and out of battery system 14 (to motor 15 and other electrical accessories of bus 10) during discharging. As would be recognized by a person skilled in the art, FIG. 2 only illustrates a simplified electrical circuit of battery pack 14, and many other circuits are possible. It should be noted that the number of battery packs and their electrical connection illustrated in FIG. 2 is only exemplary. In general, any number (6, 8, 10, etc.) of battery packs (20A-20D) may be connected together in any manner (in parallel, in series, or a combination of series and parallel) to form battery system 14. For the sake of brevity, in the discussion below, battery packs 20A, 20B, 20C, and 20D may be collectively referred to as battery pack 20, and busbars 36A, 36B, 36C, and 36D may be collectively referred to as busbar 36. Busbars 36, 38 may include an electrically conductive material (copper, aluminum, etc.) having any configuration (wire, strip, rod, bar, etc.).

Each battery pack 20 may include a plurality of battery modules 30, and each battery module 30 may include a plurality of battery cells 50 arranged therein. In FIG. 2, the internal structure of battery pack 20D, and the internal structure of one battery module 30 of battery pack 20D, is shown to aid in the discussion below. Battery cells 50 may have any suitable chemistry and configuration (e.g., cylindrical cell, prismatic cell, pouch cell, button cell, etc.). In some embodiments, battery cells 50 may have a lithium-ion chemistry. Lithium-ion chemistry comprises a family of battery chemistries (lithium-nickel-cobalt-aluminum (NCA), lithium-nickel-manganese-cobalt (NMC), lithium-manganese-spinel (LMO), lithium titanate (LTO), lithium-iron phosphate (LFP, lithium-cobalt oxide (LCO), etc.) that employ various combinations of anode and cathode materials. Exemplary battery chemistries are described in commonly assigned U.S. Pat. No. 8,453,773, which is incorporated herein by reference in its entirety.

With reference to FIG. 2, each parallel-connected battery pack 20 of battery system 14 forms a string. That is, battery pack 20A is one string of battery system 14, battery pack 20B is another string, etc. The embodiment of battery system 14 illustrated in FIG. 2 includes four strings connected together in parallel, with each string including one battery pack 20. However, this is only exemplary and other configurations are possible. For example, in some embodiments, each string may include multiple battery packs 20 (e.g., connected together in series). Configuring battery system 14 as multiple parallel-connected strings allows bus 10 to continue operating with one or more strings disconnected if a battery pack 20 in a string fails or experiences a problem. That is, if battery pack 20A experiences a problem, bus 10 may continue to operate with the string that includes battery pack 20A disconnected from battery system 14. In general, the plurality of battery modules 30 in each battery pack 20, and the plurality of battery cells 50 in each battery module 30, may be electrically connected together in series or parallel. In some embodiments, at least some of battery modules 30 in a battery pack 20 may be connected together in series, and the series-connected modules 30 may be connected together in parallel. Similarly, in some embodiments, a group of battery cells 50 in each module 30 may be connected together in series to form multiple series-connected groups of cells 50 which may then be connected be together in parallel. Although not a requirement, in some embodiments, each battery pack 20 of battery system 14 may be substantially identical (in terms of number of modules 30, number of cells 50 in each module 30, how the modules are connected, cell chemistry, etc.) to each other.

In general, battery packs 20 of battery system 14 may be physically arranged in any manner. In some embodiments, battery packs 20 may be arranged in a single layer on a common horizontal plane to decrease the height of battery system 14. Decreasing the height of battery system 14 may be advantageous in some applications. For example, a low height profile may permit battery system 14 to be mounted under the floor of a low-floor electric bus 10. In general, battery system 14 may be configured to store any amount of energy. Increasing the amount of energy stored in battery system 14 may increase the distance that bus 10 can travel between recharges. In some embodiments, the number of battery packs 20, battery modules 30, and battery cells 50, the chemistry of the battery cells, etc. may such that the total energy capacity of battery system 14 may be between about 200-700 KWh.

Although FIG. 2 shows a battery system 14 having four battery packs 20 arranged in two columns, with each battery pack 20 having six battery modules 30 arranged in two columns, and each battery module 30 having multiple battery cells 50 arranged in two columns, this is only exemplary. In general, battery system 14 may have any number of battery packs 20, battery modules 30, and battery cells 50, and they may be arranged in any configuration. In some automobile applications, battery system 14 may include 2-8 battery packs 20, with each battery pack 20 including 10-20 battery modules 30, with each battery module 30 including 400-700 battery cells 50. Each battery pack 20 may have a protective housing 24 that encloses the plurality of battery modules 30 (and other components of battery pack 20) therein. In some embodiments, battery modules 30 within the housing 24 may be separated from each other with dividers (not shown) that provide electrical and thermal insulation. The dividers may protect the other battery modules 30 if any battery module 30 fails (e.g., experiences a high temperature event). The dividers may be made of a material that does not oxidize or otherwise become damaged when exposed to electrical arcs and/or high temperatures. In some embodiments, as shown in FIG. 2, each battery module 30 may also include a housing 28 that encloses a plurality of battery cells 50 therein.

Housing 24 of each battery pack 20 may also enclose a pack controller 26 that monitors and controls the operation of battery modules 30 in battery pack 20. For example, pack controller 26 of each battery pack 20 may monitor the humidity, state of charge, current, temperature, etc. of battery modules 30 and battery cells 50 in that battery pack 20. Pack controller 26 of each battery pack 20 may control (in cooperation with the other controllers of battery system 14) the operations of that battery pack 20 to ensure that power is safely and efficiently directed into and out of battery pack 20. Although not illustrated in FIG. 2, battery module 20 may also include a thermal management system that manages the temperature (i.e., heat, cool, etc.) of battery modules 30 within desired limits. The thermal management system may include components that circulate air and/or a liquid coolant through housing 24 to heat or cool the battery pack 20.

Battery system 14 may include a battery management system (BMS 60) that cooperates with pack controller 26 of each battery pack 20 (and other controllers) to control the operation of battery system 14. BMS 60 may include circuit boards, electronic components, sensors, and controllers that monitor the performance of the components (e.g., packs 20, modules 30, and cells 50) of battery system 14 based on sensor input (e.g., voltage, current, temperature, humidity, etc.), provide feedback (alarms, alerts, etc.), and control the operation of battery system 14 for safe and efficient operation of bus 10. Among other functions, BMS 60 may protect battery system 14 from operating outside its rated or safe operating limits. Common types of battery management systems and their functions are described in Hu Rui, "Battery Management System For Electric Vehicle Applications," (2011). Electronic Theses and Dissertations. 5007. http://scholar.uwindsor.ca/etd. And, an exemplary BMS 60 that may be used in battery system 14 is described in commonly-assigned U.S. Patent Application Publication No. US 2012/0105001 A1. These references are incorporated by reference in their entirety herein.

Battery system 14 may also include overcurrent protection devices that are configured to protect components electrically connected to battery system 14 from an overcurrent. In an electrical circuit, the term overcurrent (or excess current) is used to describe a larger than intended electric current that flows through an electrical circuit. In general, overcurrent exists when current in a circuit exceeds the current rating of conductors and/or equipment in the circuit. Overcurrent may result in excessive heating and/or damage to equipment in the circuit. As known to people skilled in the art, an overcurrent may result from, among others, an overload, a short circuit, or a ground fault in the circuit. Overcurrent protection devices protect the electrical circuit by opening the circuit when current exceeds the rated value. In some embodiments, overcurrent protection devices of battery system 14 includes passive protection devices and active protection devices. Passive protection devices are devices (such as, for example, a fuse) that opens the circuit when current exceeds a threshold value. High current due to an overload heats a fusible metallic link in the fuse, causing it to melt and open the circuit. Typically, the current at which a fuse opens cannot be varied by a controller (hence the term "passive" protection device). In contrast, the opening of an "active" protection device can be controlled by a controller. Active protection devices are devices (such as, for example, relay, logic-controlled switch, contactor, etc.) that may be controlled or programmed to open at different currents, times, etc. by a controller (e.g., BMS 60).

FIG. 2 illustrates a passive protection device in the form of a fuse (42A, 42B, 42C, and 42D) and an active protection device in the form of a contactor (46A, 46B, 46C, and 46D) connected in series in a busbar (36A, 36B, 36C, and 36D) that connects each battery pack (20A, 20B, 20C, and 20D) to common busbar 38. In the discussion below, fuses 42A, 42B, 42C, and 42D will be collectively referred to as fuse 42, and contactors 46A, 46B, 46C, and 46D will be collectively referred to as contactor 42. As will be explained in more detail later, fuse 42 and contactor 46 operate to disconnect each battery pack 20 from battery system 14 in the event of an overcurrent. It should be noted that the specific overcurrent protection devices and their connection scheme illustrated in FIG. 2 are only exemplary. In some embodiments, multiple fuses (or other passive protection devices) and/or multiple contactors (or other active protection devices) may be connected to each busbar 36.

Fuse 42 is a sacrificial overcurrent protection device that includes a feature or a component (e.g., metal wire, strip, etc.) designed to a carry a limited electric current. When current in a busbar 36 exceeds this value, it will heat up the fuse component so much that it burns or melts. Once the fuse component melts, current flow through busbar 36 is interrupted and an open circuit is formed. Contactor 46 is an electromechanical switch that is controllable to selectively open and interrupt current flow through busbar 36. In some embodiments, contactors 46 may be operatively coupled to BMS 60. BMS 60 may selectively activate contactor 46 by opening (or closing) its switch, for example, magnetically. For example, a normally closed switch of contactor 46 may spring open when an electromagnetic coil is energized and close when the coil is de-energized (or vice versa). Since different types of active and passive protection devices are well known in the art, they are not described in detail herein. In some embodiments, a suitable commercially available fuse 42 and contactor 46 may be used in battery system 14.

Fuse 42 protects a battery pack 20 from a current (in the busbar 36) that exceeds a predetermined limit (e.g., 1000 A, 5000 A, 10,000 A, etc.). For example, if fuse 42 is rated for 5000 A, when current in busbar 36 exceeds about 5000 A, fuse 42 opens and prevents current flow through busbar 36. Currents that activate a fuse (i.e., cause a fuse 42 to open) are typically caused when the ohmic resistance between the positive and negative terminals of battery system 14 become very low (typically ≤ about 5 milliohms (me) for electric vehicle applications) due to, for example, a component failure or malfunction. A condition that results in such low resistance between the positive and negative terminals is often called a "hard short." Contactors 46 are typically configured (e.g., controlled) to protect a battery pack 20 from values of current that are lower than the values that cause a fuse 42 to open. For example, if fuse 42 is rated to open at 5000 A, contactor 46 may be programmed to open at a current of, for example, about 2000 A and interrupt current flow through busbar 36. Typically, currents at which contactors 46 are programmed to open are caused when the resistance between the positive and negative terminals of battery system 14 is higher than the values that result in a hard short but are lower than normal values (for example, ≤10 mΩ for electric vehicle applications). Fault conditions that result in currents that cause a contactor 46 to open are often called "soft shorts."

Although not illustrated in FIG. 2, battery system 14 may also include one or more sensors (e.g., current sensors, voltage sensors, temperature sensors, etc.), operatively coupled to BMS 60, and configured to detect the conditions of battery packs 20 and busbars 36, 38. In some embodiments, these sensors may be configured to detect the current through each busbar 36. In some embodiments, BMS 60 may selectively activate a contactor 46 (e.g., open contactor 46 to stop current flow in busbar 36) when the current in busbar 36 exceeds a predetermined limit (which, in some embodiments, may be programmed into BMS 60). In some embodiments, all contactors 46 in battery system 14 may be configured to open at the same threshold current limit. For example, when current in any one of busbars 36A, 36B, 36C, etc. exceed a threshold value, BMS 60 may energize an electromagnetic coil associated with the contactor (contactor 46A, 46B, 46C, etc.) in the bus bar to open the normally-closed switch of the contactor and interrupt current flow through the busbar 36.

In some embodiments, there may be some time delay associated with the opening of contactor 46. For example, contactor 46A may only physically open and break the circuit a certain amount of time after the current in busbar 36A exceeds the predetermined current limit. This time delay may result from time delays associated with BMS 60 (e.g., control loop time delays, etc.) and time delays (e.g., delay associated with physically opening the mechanical switch, etc.) associated with contactor 46. In general, the actual value of time delay may depend upon the application (e.g., details of battery system 14, contactor 46, BMS 60, etc.). Although not a limitation, in some embodiments, this time delay may vary between about, for example, 5-20 milliseconds (ms). That is, if contactor 46A is activated to open when the current in busbar 36A reaches (or exceeds) about 2000 A, contactor 46A may only actually open (and interrupt current flow in busbar 36A) after about 5-20 ms after the current in busbar 36A reaches this value. The time delay in opening (referred to hereinafter as "opening-delay") may vary between the different contactors 46 of battery system 14 (for example, due to small variations between the different contactors, control algorithm, etc.). That is, contactor 46A may open after about 5 ms, while contactor 46B may open only after 15 ms, etc. In some cases, this variation in opening-delay between different contactors 46 (i.e., contactors 46A, 46B, 46C, and 46D) of battery system 14 may cause the current in some busbars 36 to increase significantly above the rated value of a contactor 46 (i.e., about 2000 A in the above example). As is known in the art, when a contactor 46 is used to interrupt a current having a magnitude significantly higher than what it rated for, failure of the contactor (e.g., its contacts may melt/weld together due to arcing, etc.) may result. The example described below illustrates this scenario.

With reference to the battery system 14 of FIG. 2, in an exemplary application, the maximum current of each battery pack 20 may be 100 A, each fuse 42 may be configured to open at 6000 A (i.e., rated at 6000 A), and each contactor 46 may be configured to open at 1500 A (i.e., rated at 1500 A). Imagine that, as a result of a fault (e.g., short circuit, etc.), the current in busbar 38 reaches 6000 A. This will result in a current of about 1500 A (i.e., 6000 A/4=1500 A) in each busbar 36A, 36B, 36C, and 36D. The current sensors associated with each battery pack 20 will sense the current in its busbar 36, interpret it to be the result of a soft short, and open all contactors 46 at the same time (the fuses 42 will not open since the current in busbars 36 are below their rating). If contactors 46 did not have opening-delay (or have the same value of opening-delay), all contactors 46 will open instantaneously (or at the same time) and stop current flow in battery system 14. However, because of the variation in opening-delay between different contactors 46 (of, for example, 5-15 ms), different contactors 46 in battery system 14 may open at different times (i.e., each contactor 46 may open at some time between about 5 and 15 ms after the current in each busbar 36 reaches 1500 A).

Figure 3:
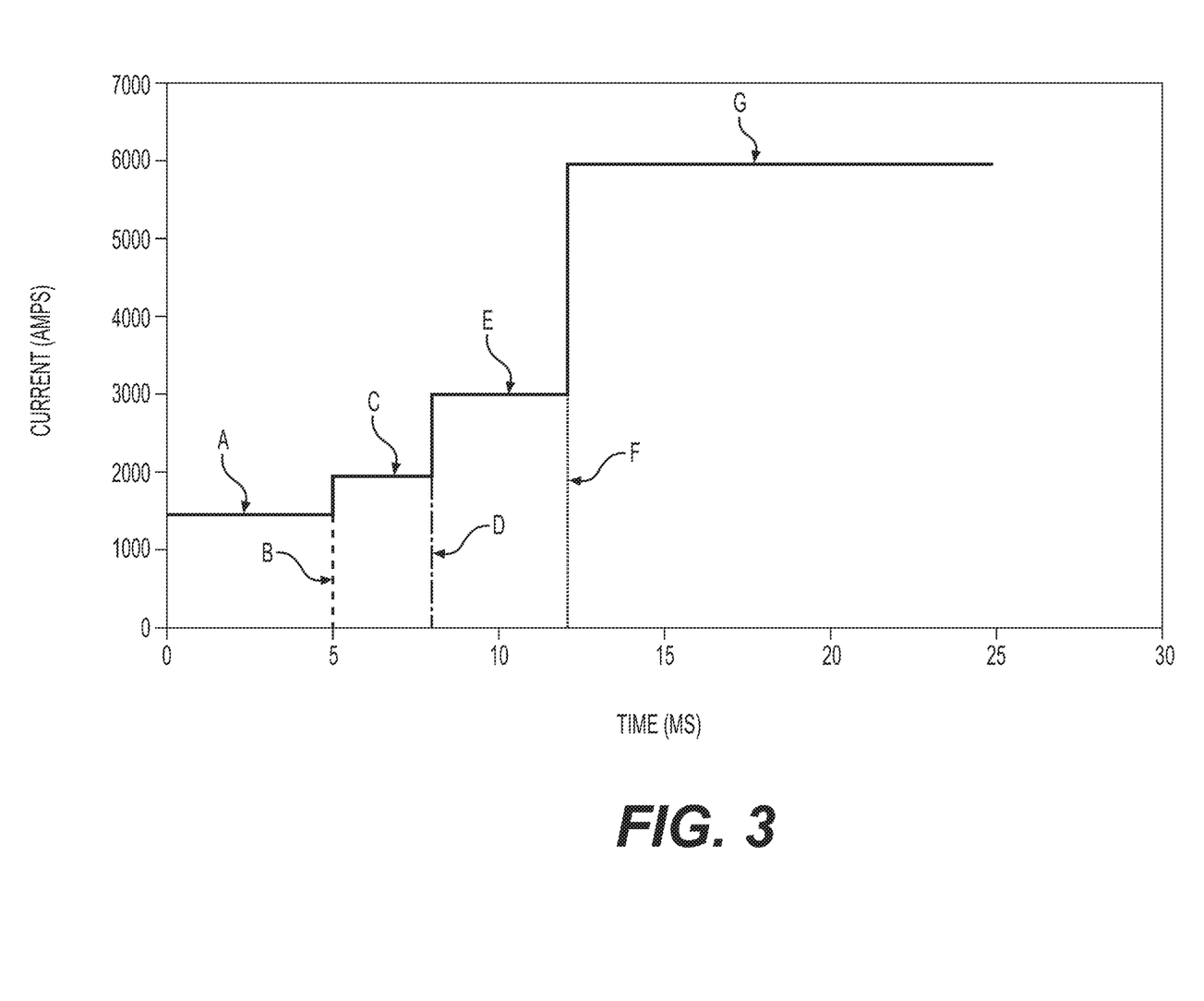
FIG. 3 is an illustration of the current in different portions of the battery system of FIG. 1.

FIG. 3 is a graph that illustrates the current in busbars 36 over time in the above-described exemplary scenario. The x-axis in FIG. 3 indicates the time in milliseconds after the fault occurs (at 0 ms) and current in each busbar 36 reaches 1500 A, and the y-axis indicates the magnitude of current (in Amps) in the different busbars 36. As seen in FIG. 3, for about 5 ms after the fault, none of the contactors 46 open and the current in each busbar 36 (i.e., 36A, 36B, 36C, and 36D) remains at 1500 A (see curve A). After 5 milliseconds (ms), one contactor opens (e.g., contactor 46A), and the current in busbar 36A drops to zero (see curve B). The current in the remaining busbars (i.e., 36B, 36C, and 36D) now becomes about 2000 A (i.e., 6000 A/3=2000 A) (see curve C). After about 8 ms, another contactor (e.g., contactor 46B) opens and the current in busbar 36B drops to zero (see curve D). As a result, the current in busbars 36C and 36D increase to 3000 A (i.e., 6000 A/2) (see curve E). After about 12 ms, contactor 46C opens, dropping the current in busbar 36C to zero (see curve F) and increasing the current in busbar 36D to 6000 A (see curve G). Thus, the contactor in the remaining string (i.e. contactor 46D) will now have to open at 6000 A.

Recall that, in this exemplary scenario, fuse 42D is rated at 6000 A. If fuse 42D of busbar 36D opens instantaneously, the current in busbar 36D may be safely reduced to zero before contactor 46D starts to open. However, in some embodiments, there may be some delay associated with the opening of fuse 42D (e.g., delay in melting, etc.). Since contactor 46D has already been activated to open (at 0 ms, see FIG. 3), it may attempt to open before fuse 42D actually opens and breaks the circuit. As would be recognized by people skilled in the art, if contactor 46D attempts to open when the current in busbar 36D is 6000 A, it may result in arcing (e.g., across the contacts of its switch) and cause failure (welding, etc.). It is possible that fuse 42D may open when contactor 46D is in the process of opening. However, even if fuse 42D opens before contactor 46D completely opens, attempting to open contactor 46D at a current significantly over its rated current may cause arcing and result in related failures.

It should be noted that the values of the currents, ratings, and opening-times in the scenario described above are only exemplary. Notwithstanding the exact values of these parameters, in a battery system comprising multiple strings of batteries (of battery packs, battery modules, etc.) connected in parallel, during an overcurrent condition, one string will open first and another string will open last due to variations in the strings (e.g., in the overcurrent protection devices, etc.). The last string to open may have to open at a current significantly higher than the rating of the overcurrent protection devices. This is an undesirable situation that may result in failure (arcing, welding, rupturing, etc.) of the overcurrent protection devices or other components of the battery system. Therefore, in some embodiments, BMS 60 may actively control the opening of the different contactors 46 (or other active protection devices) of battery system 14 in a manner such that fuses 42 (or other passive protection devices) have sufficient time to open before a contactor opens.

In one such embodiment, BMS 60 may delay the opening of the contactors of different strings (.g., contactor 46A, 46B, etc.) by different amounts of time to allow the fuse of a string to open first. For example, in the exemplary scenario described above, BMS 60 may assign time delays of, for example, 5 ms for contactor 46A, 10 ms for contactor 46B, 15 ms for contactor 46C, and 20 ms for contactor 46D. In such an embodiment, contactor 46A may only be triggered (or activated to open) about 5 ms after the current in busbar 36A reaches or exceeds (≥) about 1500 A, contactor 46B may only be triggered about 10 ms after the current in busbar 36B is ≥ about 1500 A, contactor 46C may only be triggered about 15 ms after the current in busbar 36C is ≥ about 1500 A, and contactor 46D may only be triggered about 20 ms after the current in busbar 36D is ≥ about 1500 A. In such an embodiment, when the current in busbar 36D reaches 6000 A (see curve G of FIG. 3), fuse 42D will have sufficient time to open the circuit before contactor 46D attempts to open.

The values of the different time delays described above are only exemplary. In general, any value of time delay may be assigned to different contactors 46. In general, the time delays assigned to contactors 46 of different strings may be such that, fuse 42 of the string has sufficient time to open. And, if fuse 42 does not open (i.e. the current is below the rating of the fuse), the value of current is low enough to be opened by contactor 46 without issue. In some embodiments, BMS 60 may assign contactors 46 of each string different values of time delay (as in the case described above). However, this is not a requirement. In some embodiments, one or more contactors (e.g., contactor 46A and 46B) may be assigned one time delay and one or more contactors (contactors 46C and 46D) may be assigned a different time delay. BMS 60 may assign time delays for the different contactors 46 in any manner. In some embodiments, the time delays for different contactors 46 may be preprogrammed into BMS 60.

In some embodiments, BMS 60 may assign time delays for different contactors 46 based on a design parameter of battery system 14. For example, in some embodiments, BMS 60 may assign time delays for the different strings of battery system 14 based on its location (electrical distance, impedance, etc.) in battery system 14. For example, with reference to FIG. 2, the strings associated with battery packs 20C and 20D have a higher electrical distance (e.g., length of busbar 36C and 36D), and consequently a higher impedance, than the strings associated with battery packs 20A and 20B. In some such embodiments, BMS 60 may assign higher time delays (or lower time delays) for strings that have a higher impedance than strings that have a lower impedance. It should be noted that although the BMS 60 is described as assigning different time delays to different contactors 46, this is only exemplary. In some embodiments, BMS 60 may adjust the threshold value of current at which different contactors 46 open. For example, BMS 60 may activate different contactors 46A, 46B, 46C, 46D to open at different values of threshold currents (for example, contactor 46A at about 1500 A, contactor 46B at about 1550 A, contactor 46C at about 1600 A, etc.).

While principles of the present disclosure are described herein with reference to a battery system of an electric bus, it should be understood that the disclosure is not limited thereto. Rather, the systems described herein may be employed for overcurrent protection of the battery system of any application. Also, those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

I claim:

1. A battery system, comprising:
  a controller;
  multiple battery strings connected in parallel, wherein each battery string includes:
    at least one battery,
    a passive overcurrent protection device configured to disconnect the battery string from the battery system when an electrical current in the battery string exceeds a first threshold value, and
    an active overcurrent protection device configured to disconnect the battery string from the battery system upon activation by the controller; and
  wherein the controller is configured to (a) activate a first active overcurrent protection device of a first battery string of the multiple battery strings at a first time, and (b) activate a second active overcurrent protection device of a second battery string of the multiple battery strings at a second time different from the first time.

2. The battery system of claim 1, wherein the controller is configured to assign different time delays to the activation of the first and second active overcurrent protection devices, a time delay being representative of an amount of time the controller will delay the activation of an active overcurrent protection device after a value of current in the battery string that the overcurrent protection device is part of exceeds a threshold value.

3. The battery system of claim 2, wherein the controller is configured to assign different time delays to the opening of the active overcurrent protection device of each battery string of the multiple battery strings based on a design parameter of the battery string.

4. The battery system of claim 3, wherein the design parameter is a location of the battery string in the battery system.

5. The battery system of claim 1, wherein in each battery string of the multiple battery strings, the passive overcurrent protection device is a fuse and the active overcurrent protection device is one of a contactor or a relay.

6. The battery system of claim 1, wherein in each battery string of the multiple battery strings, each battery of the at least one battery is a battery pack, the battery pack including multiple battery modules packaged together in a first housing, and each battery module of the multiple battery modules including multiple battery cells packaged together in a second housing different from the first housing.

7. The battery system of claim 6, wherein the multiple battery modules include 10-20 battery modules, and the multiple battery cells include 400-700 battery cells.

8. The battery system of claim 6, wherein each battery cell of the multiple battery cells include a lithium-ion chemistry.

9. The battery system of claim 6, wherein the multiple battery strings include at least four battery strings.

10. The battery system of claim 1, wherein the battery system is configured to be used in an electric vehicle.

11. A battery system, comprising:
  a controller;
  a first battery string including a first battery pack, a first fuse, and a first active overcurrent protection device, wherein the first active overcurrent protection device is configured to disconnect the first battery string from the battery system upon activation by the controller;
  a second battery string including a second battery pack, a second fuse, and a second active overcurrent protection device, wherein the second active overcurrent protection device is configured to disconnect the second battery string from the battery system upon activation by a controller; and
  wherein the controller is configured to assign different time delays to the activation of the first and second active overcurrent protection devices, a time delay being representative of an amount of time the controller will delay the activation of an active overcurrent protection device after a value of current in the battery string that the active overcurrent protection device is part of exceeds a threshold value.

12. The battery system of claim 11, wherein each battery pack of the first and second battery packs include multiple battery modules packaged together in a first housing, and each battery module of the multiple battery modules include multiple battery cells packaged together in a second housing different from the first housing.

13. The battery system of claim 12, wherein the multiple battery modules of each battery pack include 10-20 battery modules, and the multiple battery cells include 400-700 battery cells.

14. The battery system of claim 13, wherein each battery cell of the multiple battery cells include a lithium-ion chemistry.

15. The battery system of claim 11, wherein the battery system is configured to be used in an electric vehicle.

16. The battery system of claim 11, wherein the first and second active overcurrent protection devices include one of a contactor and a relay.

17. A method of operating a battery system, comprising:
detecting a value of electrical current in each battery string of the battery system, wherein the battery system includes (a) multiples battery strings connected together in parallel, (b) each battery string including one or more battery packs, an active overcurrent protection device, and a passive overcurrent protection device, wherein the active overcurrent protection device is configured to disconnect the battery string from the battery system upon activation by a controller;
activating using the controller, the active overcurrent protection device of a first battery string of the multiple battery strings a first time after the current in the first battery string exceeds a threshold value; and
activating using the controller, the active overcurrent protection device of a second battery string of the multiple battery strings a second time after the current in the second battery string exceeds the threshold value, wherein the second time is different from the first time.

18. The method of claim 17, wherein each battery pack of the one or more battery packs includes multiple battery modules packaged together in a first housing, and each battery module of the multiple battery modules include multiple battery cells packaged together in a second housing different from the first housing, and wherein activating the active overcurrent protection device of the first battery string includes triggering opening of a switch of the active overcurrent protection device.

19. The method of claim 17, further including assigning different time delays to the activation of the active overcurrent protection device of each battery string of the multiple battery strings, a time delay being representative of a time interval after which the controller will activate the active overcurrent protection device of each battery string.

20. The method of claim 19, wherein assigning different time delays includes assign a value of time delay to the active overcurrent protection device of each battery string based on a location of the battery string in the battery system.

* * * * *